(12) United States Patent
Boss et al.

(10) Patent No.: US 9,621,586 B2
(45) Date of Patent: Apr. 11, 2017

(54) METHODS AND APPARATUS FOR ENHANCING BUSINESS SERVICES RESILIENCY USING CONTINUOUS FRAGMENTATION CELL TECHNOLOGY

(71) Applicant: International Business Machines Corporation, Armonk, NY (US)

(72) Inventors: Gregory J. Boss, Saginaw, MI (US); Youssef Drissi, Peekskill, NY (US); Rick A. Hamilton, II, Charlottesville, VA (US); Chung-Sheng Li, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/176,079

(22) Filed: Feb. 8, 2014

(65) Prior Publication Data

US 2015/0229671 A1    Aug. 13, 2015

(51) Int. Cl.
*H04L 29/06* (2006.01)
*G06F 21/60* (2013.01)
(Continued)

(52) U.S. Cl.
CPC .............. *H04L 63/20* (2013.01); *G06F 21/60* (2013.01); *G06F 21/6227* (2013.01);
(Continued)

(58) Field of Classification Search
CPC ......... H04W 28/06; H04L 45/72; H04L 45/38
(Continued)

(56) References Cited

U.S. PATENT DOCUMENTS 6,957,349 B1 * 10/2005 Yasukura ................. H04L 9/34
                                                                380/216
7,203,843 B2     4/2007 Yoshida
(Continued)

FOREIGN PATENT DOCUMENTS

GB          002444343 A      6/2008

OTHER PUBLICATIONS

Shucheng Yu, et al., "Achieving Secure, Scalable, and Fine-grained Data Access Control in Cloud Computing," IEEE INFOCOM 2010 Proceedings, 2010, pp. 534-542.

*Primary Examiner* — Abu Sholeman
(74) *Attorney, Agent, or Firm* — Daniel P. Morris, Esq.; Otterstedt, Ellenbogen & Kammer, LLP

(57) ABSTRACT

A method for enhancing resiliency of a service includes: decomposing at least one component associated with the service into a plurality of corresponding smaller elements; encrypting the elements to generate a corresponding plurality of encrypted elements; decomposing each of the encrypted elements into a corresponding plurality of smaller fragments; replicating each of the fragments; encapsulating the fragments into respective intelligent components, each of the intelligent components corresponding to a given one of the encapsulated fragments, each of the intelligent components being configured to independently determine a location of a first storage element in which to store itself; storing each of the intelligent components; and moving the intelligent components from the first storage element location to a second storage element location.

20 Claims, 4 Drawing Sheets

(51) Int. Cl.
   *H04L 29/08* (2006.01)
   *H04L 29/14* (2006.01)
   *G06F 21/62* (2013.01)

(52) U.S. Cl.
   CPC ...... *H04L 63/0428* (2013.01); *H04L 63/1441* (2013.01); *H04L 63/1458* (2013.01); *H04L 67/06* (2013.01); *H04L 67/1097* (2013.01); *H04L 69/40* (2013.01)

(58) Field of Classification Search
   USPC .................. 726/26, 1, 24, 25; 370/328, 392
   See application file for complete search history.

(56) References Cited

U.S. PATENT DOCUMENTS

| | | | |
|---|---|---|---|
| 7,382,731 B1 * | 6/2008 | Zhao et al. | 370/236 |
| 7,382,787 B1 * | 6/2008 | Barnes | H04L 12/66 370/401 |
| 7,644,171 B2 * | 1/2010 | Sturniolo | H04W 80/045 709/230 |
| 2002/0038375 A1 * | 3/2002 | Yamada | H04L 67/06 709/231 |
| 2007/0276951 A1 | 11/2007 | Riggs et al. | |
| 2008/0022225 A1 * | 1/2008 | Erl | G06F 9/4443 715/784 |
| 2008/0170531 A1 * | 7/2008 | Petry | H04L 65/601 370/312 |
| 2011/0022640 A1 | 1/2011 | Franco et al. | |
| 2012/0011578 A1 * | 1/2012 | Hinton et al. | 726/8 |
| 2012/0151568 A1 * | 6/2012 | Pieczul et al. | 726/8 |
| 2012/0163592 A1 | 6/2012 | Bellare et al. | |
| 2012/0166582 A1 * | 6/2012 | Binder | H04L 63/18 709/217 |
| 2012/0311339 A1 | 12/2012 | Irvine | |
| 2014/0269716 A1 * | 9/2014 | Pruss | H04L 45/38 370/392 |
| 2014/0355607 A1 * | 12/2014 | Seaman-Kossmeyer | H04L 45/72 370/392 |
| 2015/0333958 A1 * | 11/2015 | Xu | H04L 41/0803 370/389 |

\* cited by examiner

METHODS AND APPARATUS FOR ENHANCING BUSINESS SERVICES RESILIENCY USING CONTINUOUS FRAGMENTATION CELL TECHNOLOGY

BACKGROUND OF THE INVENTION

The present invention relates generally to the electrical, electronic and computer arts, and, more particularly, to business services resiliency.

Business services are increasingly supported by information technology (IT) systems, which may include software, hardware and other resources. However, these IT systems are often vulnerable to threats, both cyber-based and geographically-based. These threats pose an ever-increasing number of challenges to businesses, systems and infrastructures.

BRIEF SUMMARY

Principles of the invention, in accordance with embodiments thereof, provide techniques for enhancing business services resiliency. In one aspect, an exemplary method includes the steps of: decomposing at least one component associated with the service into a plurality of corresponding smaller elements; encrypting the elements to generate a corresponding plurality of encrypted elements; decomposing each of the encrypted elements into a corresponding plurality of smaller fragments; replicating each of the fragments; encapsulating the fragments into respective intelligent components, each of the intelligent components corresponding to a given one of the encapsulated fragments, each of the intelligent components being configured to independently determine a location of a first storage element in which to store itself; storing each of the intelligent components; and moving the intelligent components from the first storage element location to a second storage element location.

In accordance with another embodiment of the invention, an apparatus for enhancing business services resiliency includes a memory and at least one processor coupled to the memory. The processor is operative: to decompose at least one component associated with a service into a plurality of elements; to encrypt the plurality of elements to generate a corresponding plurality of encrypted elements; to decompose each of the plurality of encrypted elements into a corresponding plurality of smaller fragments; to replicate each of the plurality of fragments; to encapsulate the plurality of fragments into respective intelligent components, each of the intelligent components corresponding to a given one of the encapsulated fragments; to independently determine a location of a first storage element for each of the intelligent components; to store each of the intelligent components; and to move the intelligent components from the first storage element location to a second storage element location.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide better cyber-security against:

Denial-of-service (DoS) attacks;

Simultaneous and coordinated attacks on multiple sites and/or data centers;

Loss of data or service due to natural disasters.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

Figure 1:
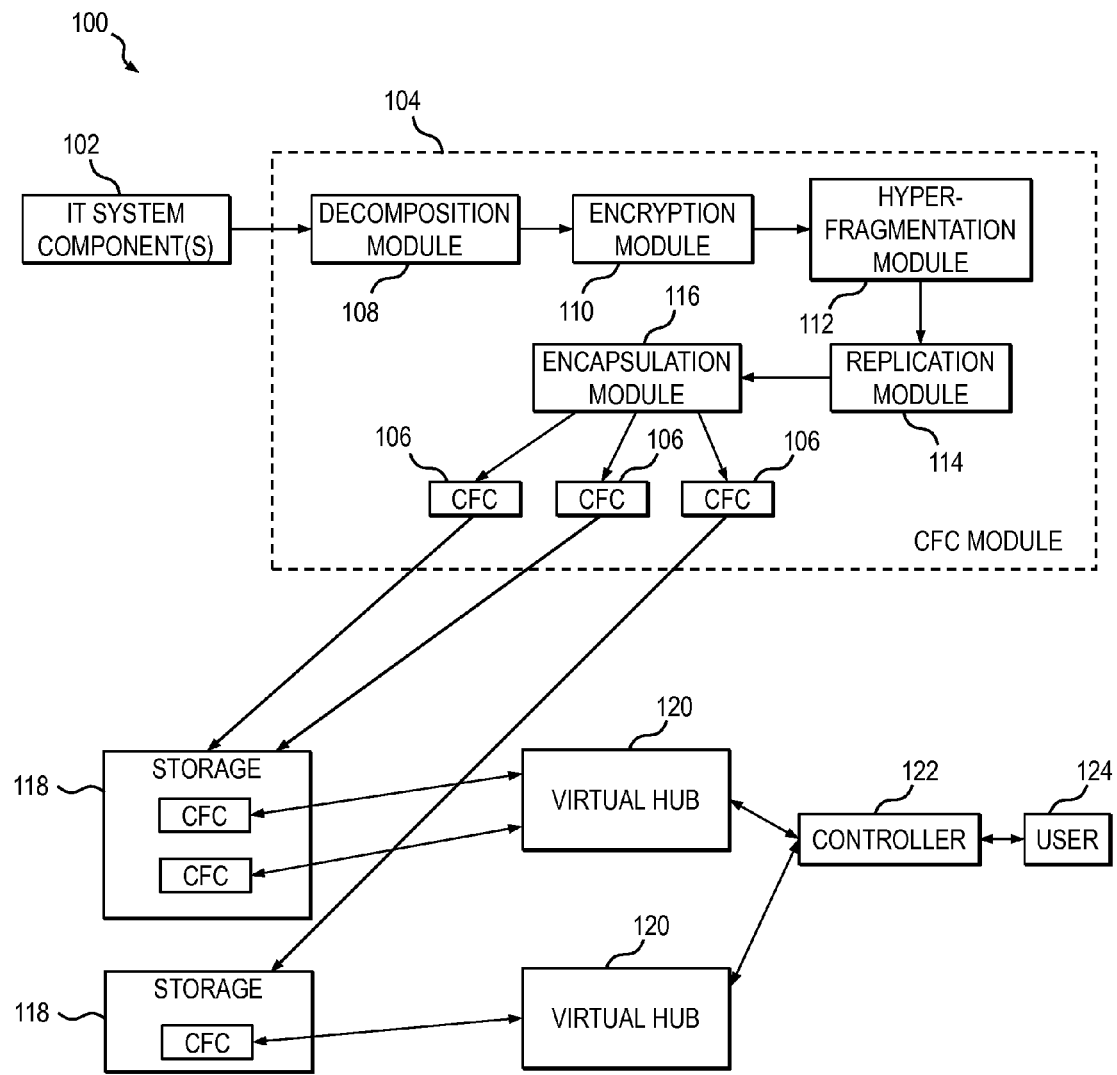
FIG. 1 is a block diagram depicting at least a portion of an exemplary system providing enhanced resiliency of business services and systems against threats (e.g., cyber-based and geographically-based), according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the present invention will be described herein in the context of illustrative cyber-security methods and apparatus for making business services and systems more resilient against different types of attacks. It is to be appreciated, however, that the invention is not limited to the specific apparatus and/or methods illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

As previously stated, the IT systems that support business services and concentrated business workloads are vulnerable to threats, both cyber-based and geographically-based. Significant cyber-security challenges already exist and will worsen as markets move toward systems with fully integrated servers, storage and networks in a dense server/storage environment (e.g., cloud computing). For example, a handful of users may be targeted by one or more phishing attacks. As is known in the art, "phishing" can be defined as the act of attempting to acquire protected information such as, for example, usernames, passwords, and credit card data, by masquerading as a trustworthy entity in an electronic communication. Such attacks often come in the form of a malicious email which an unsuspecting user opens, thereby initiating the execution of malware on a user's machine, or redirection of the user to a fake website. In this manner, the attacked user machine is accessed remotely by a malicious software program (i.e., back door).

Once on the network, these back door programs may remain resident on the user machine and provide continued access to user information by a malicious entity. The malicious software (e.g., malware) facilitates access to important user, service and/or administrative accounts, and specific systems (lateral movement). The malicious software then acquires data from target servers and stages the data for exfiltration (i.e., data theft). The data is exfiltrated via encrypted files and sent to external machines at a hosting provider (exfiltrate). The malware may erase evidence of its existence from the compromised network to avoid forensic detection.

Existing technologies that attempt to make computing systems more resilient to cyber-based threats (e.g., malware, viruses, etc.) range from traditional security systems and software, including, but not limited to, firewalls, anti-virus and anti-malware programs, encryption, redundancy and failover, workload shifting, etc., to advanced business continuity and recovery services (BCRS). However, cyber-threats are increasingly frequent and sophisticated, making the IT systems more vulnerable even with these existing technologies. Generally, some of the limitations of these technologies are coordinated simultaneous attacks on multiple sites; denial-of-service (DoS) attacks; and massive natural disasters. Technologies also exist that permit some degree of resiliency against natural disasters, which may be restricted to a single geographic location, and man-made attacks, if such attacks target a specific region. However, because legacy protection mechanisms are duplicated across multiple systems, they can be simultaneously defeated when the attacker launches a coordinated assault. Thus, legacy mechanisms for defending against such coordinated attacks are insufficient to match emergent threats to business service provision.

One or more embodiments of the invention provide techniques for addressing cyber-security problems and making business services more resilient against different types of attacks. This is achieved, in some embodiments, with a novel methodology of decomposing services and associated IT systems into smaller elements, keeping these elements in quasi-constant movement, even when there is no threat detected, and averting potential cyber-based attacks (e.g., data centers affected by a virus) or geographically-based threats (e.g., physical data centers affected by a natural disaster). In one or more embodiments, these elements are encapsulated into smart components, referred to herein as "continuous fragmentation cells" (CFCs), that have the ability to make independent decisions (e.g., about the location of their next move). In this manner, CFCs are capable of independently performing evasive maneuvers, moving away from threats, and/or enabling vanishing services, as will be described further below. Techniques of the invention are applicable to data and/or services.

More particularly, as an overview, components that make up an IT system (e.g., software, and potentially hardware and other resources) that support business services are decomposed, logically and/or physically, into a hierarchy of smaller elements that are packaged into smart components, which may be referred to herein as "smart ants," that can be replicated for redundancy in such a way that damage to or destruction of a small component (or a prescribed number of small components) would not adversely affect the overall availability and functions of the IT system as a whole. Methodologies (e.g., algorithms) for performing the decomposition are operative, in one or more embodiments, to take executable binaries and data (i.e., zeros and ones), encrypt the binaries and data and randomly extract small sets of bytes, called fragments, from the encrypted binaries. In some embodiments, each fragment is stored in a smart ant. Each fragment, when considered individually (i.e., separated from other fragments), are non-functional to a hacker, even when the fragment is made publicly available.

In one or more embodiments, any available computer in communication with the Internet, or alternative network, can be used as a temporary storage site or node (e.g., in exchange for a prescribed fee or alternative incentive) for smart ant replication. In addition, the smart ants are in constant or quasi-constant movement, thereby making it difficult to determine their respective locations by a potential hacker. Each smart ant is capable of independently deciding a location of its next move, thus allowing it to act as a micro-server that returns fragments of data and/or services to certain virtual hubs, which function as clients in this particular transaction. In one or more embodiments, the smart ants are operative to report their respective locations at any given time to a network of virtual hubs. The virtual hubs contain distributed information, referred to herein as "ant maps," that enable the hubs to retrieve information (i.e., data and/or services) from the smart ants for a given requested service.

According to one or more embodiments, when a business or other service is invoked/requested, a temporary virtual in-memory image of the service is constructed (e.g., on-demand) by forwarding the service request to the hubs, which then retrieve instances of the required fragments. Once the service request has been fulfilled, the temporary service is deconstructed (i.e., destroyed), making its lifespan as brief as possible to render impossible, or at least significantly reduce the likelihood of, any download attempt, since essentially there would not be enough time to complete such attempt. Thus, an important aspect of embodiments of the invention is to beneficially make the services and underlying IT systems supporting the services highly transient, by design, to thereby avoid giving potential hackers sufficient time to download data or manipulate the services and/or IT systems.

FIG. 1 is a block diagram depicting at least a portion of an exemplary system 100 providing enhanced resiliency of business services and systems against threats (e.g., cyber-based and geographically-based), according to an embodiment of the invention. In the system 100, one or more IT system components 102, which in some embodiments includes software, hardware, and/or other resources which support business services, are supplied to a continuous fragmentation cell (CFC) module 104. The CFC module 104 is adapted to receive the IT system components 102 and is operative to transform these components into a plurality of continuous fragmentation cells (CFCs) 106. As will be further described below, in one or more embodiments, the CFC module 104 includes a decomposition module 108, an encryption module 110, a hyper-fragmentation module 112, a replication module 114 and an encapsulation module 116. The CFCs 106 generated by the CFC module 104 are stored in one or more storage means 118, preferably in a distributed manner. Information contained in the CFCs 106 is communicated to one or more virtual hubs 120, which then reconstruct the original IT system components, at the direction of a controller 122 coupled with the virtual hubs, for presentation to a user 124.

The decomposition module 108 is adapted to receive one or more IT system components 102 that support business services and is operative to decompose these components, physically and/or architecturally, into a hierarchy of smaller elements. In one or more embodiments, each of the decomposed elements generated by the decomposition module 108 is assigned a unique primary (universal) identifier (ID). Identifiers suitable for use with embodiments of the invention will become apparent to those skilled in the art, and include, for example, universal resource locator (URL) addresses, or automatically generated unique identifiers. A decomposition map is generated by the decomposition module 108, based at least in part on the unique primary IDs associated with the elements. The decomposition map is used to reconstitute the original IT system components (i.e., objects) and is preferably part of a larger structure, referred to herein as a service universal mapping ID (SUMI), which identifies the service that is supported by the IT system components 102.

The decomposed elements generated by the decomposition module 108 are presented to the encryption module 110 for further processing. The encryption module 110 is adapted to receive the decomposed elements and is operative to encrypt the elements, using, for example, high-grade encryption keys and algorithms, that are added to the SUMI created for that service/data. The encrypted elements generated by the encryption module 110 may be referred to herein as "encrypted elements" or "encrypted fragments" (e.g., binaries—typically, a series of "0's" and "1's" that make up computer files and executable programs). In one or more embodiments, increased protection of the system 100 is provided by ensuring encryption keys are unique to the CFCs 106. This provides the ability to replicate and store CFCs 106 in public or private locations (e.g., clouds, peer-to-peer (P2P) networks, etc.) safely, through successive fragmentation, encryption and distribution.

The encrypted binaries generated by the encryption module 110 are further decomposed into smaller fragments using the hyper-fragmentation module 112. The hyper-fragmentation module 112, in one or more embodiments, is adapted to receive the encrypted binaries and utilizes one or more algorithms operative to randomly extract small sets of bits of bytes, referred to herein as "fragments," from the encrypted binaries. As previously stated, when considered individually, separated from other fragments, each fragment is essentially indecipherable and/or non-functional, even if made public, and is therefore of no practical use to a malicious entity. In one or more embodiments, the hyper-fragmentation module 112 is operative to construct a fragmentation map to facilitate reconstitution of the original elements. The fragmentation map is added to the SUMI created for a corresponding service or data.

The fragments generated by the hyper-fragmentation module 112 are replicated for redundancy in the replication module 114. It is to be appreciated that the invention is not limited to any specific number of copies made of each fragment. Moreover, the number of copies need not be fixed, but can, for example, be configurable based on some measure of importance of the data and/or availability of storage space, among other factors. The fragments are replicated in such a manner that damage to or destruction of a given fragment will not affect the overall availability and/or functions of the IT system 100 as a whole, since the lost information can be retrieved from a corresponding replicated fragment. Each replicated fragment is assigned a secondary unique identifier, in accordance with one or more embodiments. The secondary unique ID can be used to identify the specific replica of the fragment and differentiate it from other copies; generally, it can be any unique string.

The original and replicated fragments outputted by the replication module 114 are supplied to the encapsulation module 116. The encapsulation module 116, which is adapted to receive the fragments and copies thereof, is operative to package each fragment into a smart component, referred to herein as a "continuous fragmentation cell" (CFC) 106 or "smart ant," as previously stated. The CFCs 106 are at least temporarily stored in one or more storage elements 118. In one or more embodiments, the storage elements 118 are configured in a highly distributed architecture. It is to be appreciated that embodiments of the invention are not limited to any specific number of CFCs 106 stored in a given storage element 118. Furthermore, the number of CFCs 106 stored in each of the storage elements 118 need not be the same. Although embodiments of the invention do not prevent the storage of CFCs 106 in a secure center, the unique architecture of embodiments of the invention (wherein the IT components 102 are decomposed into individual, essentially unusable CFCs 106) does not require the CFCs 106 to be stored in secure storage centers. Hence, any available computer on the Internet, or connected with the system 100 via another means (e.g., wireless communication link, etc.), can be used as a temporary storage element for the CFCs 106 (e.g., in exchange for a small fee to the computer owner). In one or more embodiments, the CFCs 106 are distributed among a plurality of storage elements 118 in a manner which maximizes an amount of physical and/or logical separation.

As previously stated, the system 100 includes one or more virtual hubs 120. The virtual hubs contain distributed information, referred to herein as "ant maps," that enable the hubs to retrieve information (i.e., data and/or services) from the CFCs 106, stored in a distributed manner among the storage elements 118, for a given requested service. In accordance with one or more embodiments, addresses of the virtual hubs 120 are protected (i.e., secret) and change according to a prescribed algorithm (which is also preferably protected) that is updated and communicated to the CFCs 106 when they report their respective locations, such as, for example, by transmitting to each of the CFCs (or at least a subset of the CFCs) a list of new Internet Protocol (IP) addresses added to the network of hubs.

As part of the encapsulation process performed by the encapsulation module 116, each fragment is provided with an intelligent decision-making infrastructure which enables the fragment to independently decide which storage location 118 to move to at any given time. Any independent, self-sufficient decision-making process can be used for identifying a storage location to which to move. For example, each CFC 106 may maintain a list of locations and select, randomly, a location from the list for the next move. In this manner, the plurality of fragments act as individual microservers, each of which returns the corresponding fragment of data/services to virtual hubs 120 (functioning as clients in this particular transaction). Moreover, the CFCs 106, in one or more embodiments, are operative to report their respective current temporary locations to a network of distributed nodes, with IP addresses of the virtual hubs themselves being randomized, continually or at prescribed time intervals, to provide a heightened level of security.

In one or more embodiments, movement of each of the CFCs 106 among the plurality of storage elements 118 is independent of one another. The time between successive moves of a given CFC 106 may be random, fixed, or vary according to a prescribed algorithm, for instance, as determined by the CFC itself. Thus, a first CFC 106 may move to different storage elements 118 at random times while a second CFC may move to different storage elements according to a prescribed schedule. After each move of a given CFC 106, the CFC transmits the location of its new storage element 118 to a corresponding virtual hub 120 associated with that storage element.

The virtual hubs 120 receive a request (i.e., call) for services or data from a user 124, such as via a controller 122, and broadcast this request to the CFCs 106 in the storage means 118. Although shown as a separate functional component, the controller 122, or functions thereof, may reside in one or more of the virtual hubs 120. In one or more embodiments, after the CFCs 106 authenticate the request or broadcast from the virtual hub 120, the CFCs return a copy of themselves to a corresponding virtual hub 120, where a temporary virtual in-memory image of the requested business service or data is built on-demand. A "virtual in-memory image" may be broadly defined herein as a copy that resides in the transient memory of the computer, as opposed to a persisted copy residing in hard drive files or other physical storage. A business service can be any operation requested or provided (e.g., generating a financial report, running a software program, solving a supply chain problem, computing performance metrics, launching a process to manufacture a product, etc.) Each of the virtual hubs 120 preferably comprises its own memory, and the CFCs 106 are processed in the hubs' memory to provide an image of the service/data, which is then sent to the user. The controller 122 is operative to coordinate the retrieval of information from the distributed CFCs 106 through the corresponding virtual hubs 120 during a reconstruction of the requested service and/or data for presentation to the user 124. After the request is fulfilled (e.g., the business service or data is sent to the requesting user 124), the temporary service or data is self-destroyed, in accordance with one or more embodiments. The temporary service or data may be self-destroyed in a manner consistent with the deletion of a file residing on a computer. For example, in one or more embodiments, the temporary service is destroyed by setting all the bytes that make up the service/data in memory to zeros. By providing "vanishing" services or data (e.g., services or data that are virtually built upon request and then destroyed after the request is fulfilled), one or more embodiments of the invention effectively eliminate, or at least significantly reduce, the opportunity for a malicious entity to inappropriately download or otherwise prevent execution of the requested services and/or data.

Figure 2:
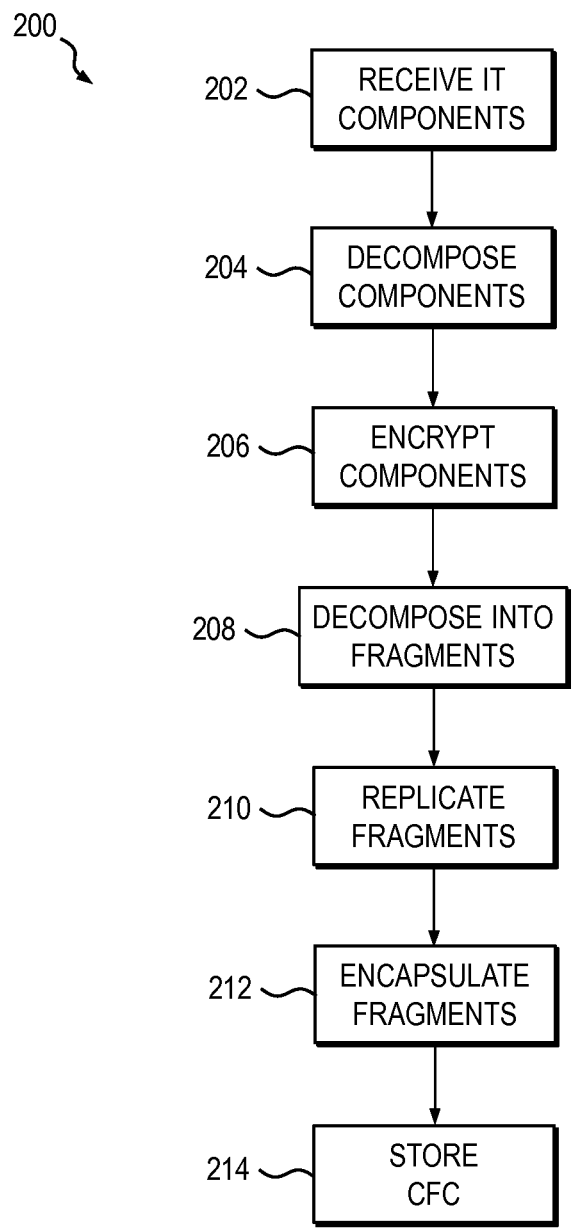
FIG. 2 is a flow diagram depicting at least a portion of an exemplary method for enhancing the resiliency of a service against detected threats and/or abnormal system behavior, according to an embodiment of the invention.

FIG. 2 is a flow diagram depicting at least a portion of an exemplary method 200 for enhancing the resiliency of a service against detected threats and/or abnormal system behavior, according to an embodiment of the invention. With reference now to FIG. 2, the method 200, in step 202, is operative to receive one or more components that make up the IT systems (e.g., software, firmware, hardware, and/or other resources) that support one or more services (e.g., business services). These components are decomposed in step 204, either physically or architecturally (e.g., virtually) into a hierarchy of smaller elements, such as by using a decomposition module (e.g., 108 in FIG. 1) or other means. In one or more embodiments, the decomposed elements comprise executable binaries and data (zeros and ones). As previously stated, each of the decomposed elements is assigned a unique primary identifier, and a map (e.g., decomposition map) is constructed, using the unique primary identifiers, which can be used to reconstitute the original IT system components.

In step 206, the decomposed elements representative of the received IT components are then encrypted, such as by using an encryption module (e.g., 110 in FIG. 1). Step 206 may be performed, in one or more embodiments, using high-grade encryption keys and/or algorithms that are added to a SUMI created for a corresponding service or data. The encrypted elements are the decomposed further in step 208 into smaller fragments, such as by using a fragmentation module (e.g., 112 in FIG. 1), or similar mechanism. In accordance with embodiments of the invention, one or more algorithms are employed to randomly extract small sets of bits of bytes (i.e., fragments) from the encrypted elements generated in step 206. By itself (i.e., separated from other fragments), each fragment is unreadable or otherwise inoperative, even if made public, and is therefore useless to a malicious entity. A fragmentation map is created in step 208 which is used to enable reconstitution of the original elements, and the fragmentation map is then added to the SUMI created for the corresponding service or data.

In step 210, the fragments, or at least a subset thereof, are replicated for redundancy purposes. Any known replication methodology may be used to replicate the fragments. Each replicated fragment is assigned a unique secondary identifier to facilitate retrieving the replicated fragment, should the original fragment become lost or otherwise corrupted. In this manner, damage to or destruction of a small component (or components) in the IT system would not affect the overall availability or functioning of the system.

In step 212, each replicated and original fragment is packaged (i.e., encapsulated) into an intelligent component, referred to herein as a CFC or a smart ant, such as by using an encapsulation module (e.g., 116 in FIG. 1) or similar means, as previously described. Encapsulation of each fragment provides the fragment with the capability to independently determine a next location for temporary storage of the fragment. In this manner, the intelligent components truly resemble "ants," in continual or quasi-constant movement from one storage location to the next, so as to make it highly difficult for a malicious entity to access or otherwise read the fragment for obtaining information regarding the service to which the fragment corresponds. Moreover, even if an entity was able to retrieve the information contained in a given fragment, the information, by itself, would not allow the entity to reconstitute the original service or data, which requires obtaining all, or at least a larger subset, of the decomposed components.

The CFCs are at least temporarily stored in a corresponding storage element in step 214, as determined by the CFC itself. The CFCs transmit their respective temporary storage locations to one or more virtual hubs, or an alternative network of distributed nodes, in communication with the storage elements, so that when a service request is initiated, the virtual hubs are able to retrieve the information from all of the fragments associated with the requested service and thereby reconstruct the service for presentation to an authenticated requesting user.

As described above, each CFC is able to independently decide what storage location to move to and how long to stay at that location. For example, in one or more embodiments, the CFC determines whether a potential threat (e.g., storage center affected by a virus, or physical center affected by a natural disaster) or abnormal behavior (e.g., DoS attack) exists, and takes appropriate action to change its storage location in an evasive maneuver so as to avoid the threat or abnormal behavior. The CFC may increase an intensity of evasive maneuvers depending on an established level of the perceived threat. The CFC may also, in some embodiments, change location even when a threat is not detected, with the assumption that the constant movement would make it difficult for a malicious entity to pin-point the location of a given CFC. Additionally, each CFC may, in one or more embodiments, communicate with one or more other CFCs, either directly or through the network of virtual hubs, to thereby exchange information, such as information relating to detected threats, etc.

Figure 3:
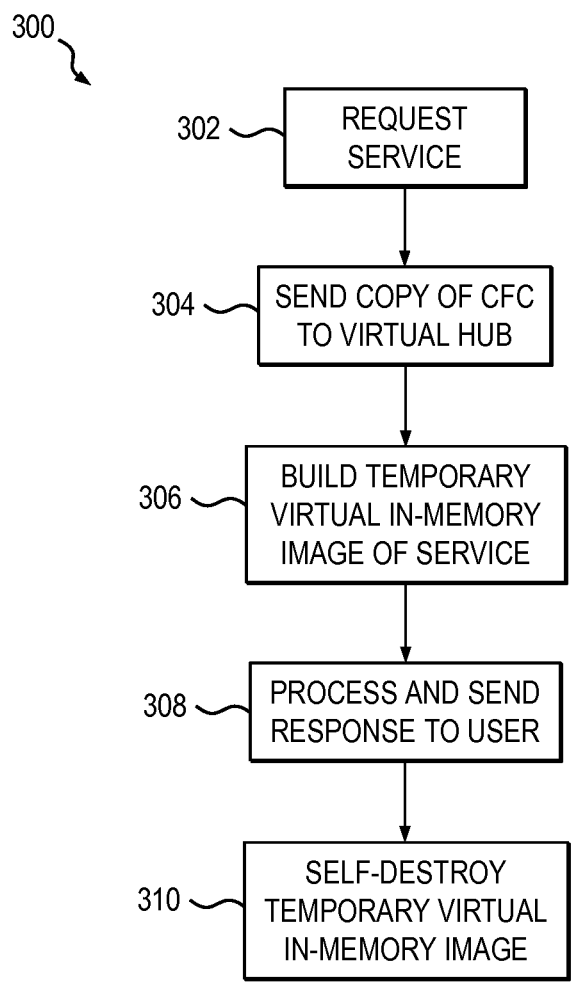
FIG. 3 is a flow diagram depicting at least a portion of an exemplary method for responding to a request for service, according to an embodiment of the invention.

With reference now to FIG. 3, a flow diagram depicts at least a portion of an exemplary method 300 for fulfilling a client request for service, according to an embodiment of the invention. In step 302, a user initiates a request for a service, such as a business service, which is then forwarded to the network of distributed virtual hubs (e.g., virtual hubs 120 in FIG. 1). The virtual hubs, in turn, broadcast this request to all of the corresponding CFCs (e.g., CFCs 106 in FIG. 1) in all of the respective storage locations (e.g., storage element 118 in FIG. 1). Each CFC, in one or more embodiments, has the capability to independently determine whether or not the service request or call is authentic (e.g., based on internal and/or contextual information).

Once the request is authenticated, the request is answered by returning a copy of the CFC to the corresponding virtual hub in step 304. In some embodiments, a prescribed minimum number of CFCs needed to fulfill the service request are provided to the virtual hub. The minimum number of CFCs required to fulfill a given service request may be a function of the type of service requested, or other characteristics of the service or request. In one or more embodiments, the IP address of the virtual hub is changed according to an algorithm that can be updated at prescribed times to further enhance security. The algorithm may be kept confidentially by architects of the system. In one or more embodiments, the IP address of each virtual hub is secret and is randomized at prescribed time intervals. For example, in some embodiments, the IP address of the virtual hub is updated and communicated to the CFC when the CFC reports its current temporary location (e.g., by giving the list of new IP addresses added to the network of virtual hubs), as previously described.

After the client service request is authenticated, a temporary virtual in-memory image of the requested service is constructed, on-demand (server image rejuvenation), in step 306 using the acquired copies of the CFCs for that service. The image is then processed into a response, and the response, comprising the image, is sent to the user that initiated the service request in step 308, thereby fulfilling the request. Once the service request has been fulfilled, the temporary virtual in-memory image is self-destroyed or deconstructed in step 310. Since there are other copies of the CFCs in existence (e.g., storage in a distributed manner among the storage elements), the self-destruction of the image does not negatively impact the system. In one or more embodiments, the temporary virtual in-memory image has a life span that is as short as possible to avoid providing enough time for a malicious entity to successfully complete a download attempt, or other malicious action involving the requested service. In other words, the services and underlying IT systems are configured to be transient, by design, to avoid giving malicious entities enough time to download data or manipulate services and IT systems. The virtual hubs, according to one or more embodiments, are also able to selectively isolate and quarantine malicious requests, provide fast workload migration, and provide a secure ship. The term "workload migration" is intended to refer broadly to the migration of services, data, and/or processing capabilities from one machine to one or more different machines. The term "secure ship" is intended to refer broadly to a computer ship wherein data is only decrypted inside a physical ship.

The approach according to embodiments of the invention is beneficial for defending a site prone to coordinated attacks, for example, and more resilient than having traditional BCRS sites that provide backups and services hosted in fixed locations which could otherwise be subject to simultaneous attacks. As an analogy, a predator (e.g., hackers/attackers) have a far more difficult job capturing its prey (e.g., IT services) if the prey is moving as opposed to stationary.

Given the discussion thus far, it will be appreciated that, in general terms, an exemplary method for enhancing resiliency of a service (e.g., business service) according to an aspect of the invention includes the steps of: decomposing at least one component associated with the service into a plurality of corresponding smaller elements; encrypting the elements to generate a corresponding plurality of encrypted elements; decomposing each of the encrypted elements into a corresponding plurality of smaller fragments; replicating each of the fragments; encapsulating the fragments into respective intelligent components, each of the intelligent components corresponding to a given one of the encapsulated fragments, each of the intelligent components being configured to independently determine a location of a first storage element in which to store itself; storing each of the intelligent components; and moving the intelligent components from the first storage element location to a second storage element location.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
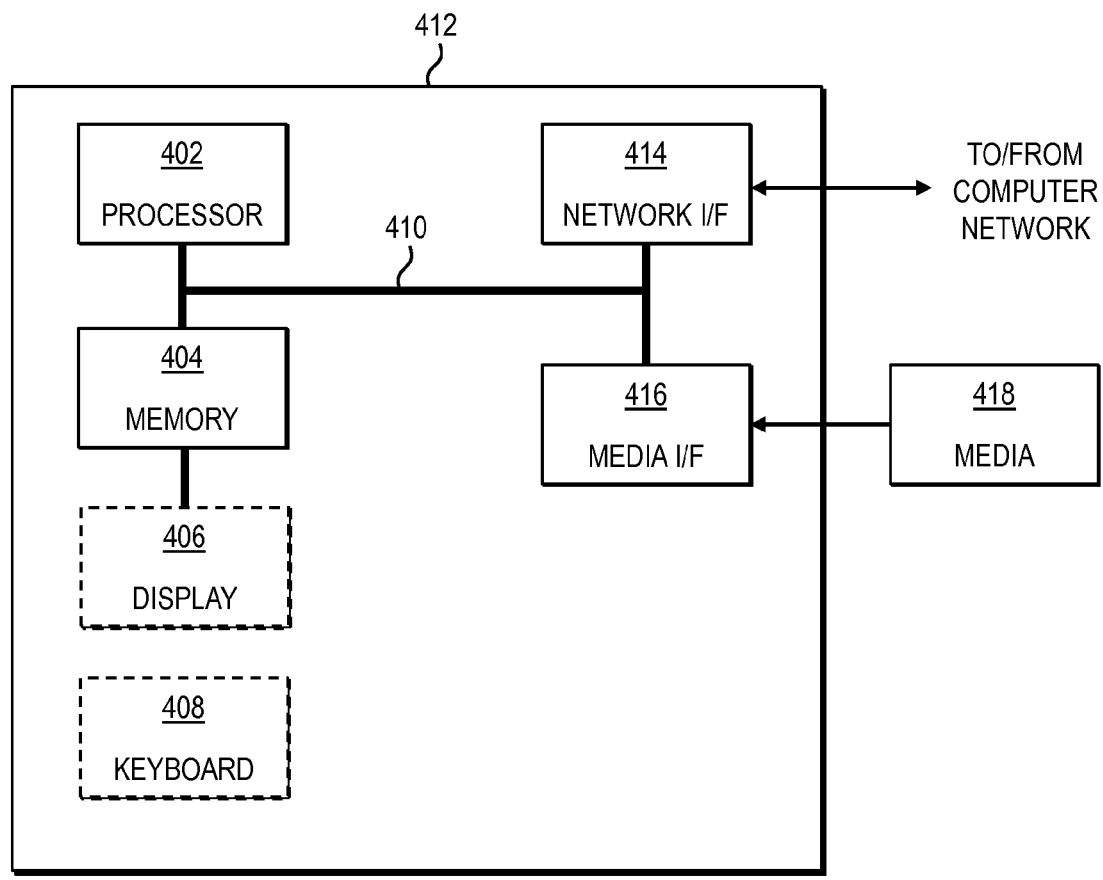
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a continuous fragmentation cell (component) module, and a decomposition module. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for enhancing resiliency of a service, the method comprising:
    decomposing, by a decomposition module executing on at least one hardware processor, at least one component associated with the service into a plurality of corresponding smaller elements;
    encrypting, by an encryption module executing on the at least one hardware processor, the plurality of elements to generate a corresponding plurality of encrypted elements;
    decomposing each of the plurality of encrypted elements into a corresponding plurality of smaller fragments, the plurality of fragments comprising subsets of bits of bytes from the encrypted elements;
    encapsulating, by an encapsulation module executing on the at least one hardware processor, the plurality of fragments into respective intelligent components, each of the intelligent components corresponding to a given one of the encapsulated fragments and forming a continuous fragmentation cell;
    distributing the intelligent components to a plurality of storage element locations; and
    moving the intelligent components independently within the plurality of storage element locations, wherein each intelligent component independently determines a given storage element location into which that intelligent component should be moved next, and wherein the intelligent components do not have a predetermined destination.

2. The method of claim 1, wherein at least a subset of the intelligent components are continuously moved within the plurality of storage element locations.

3. The method of claim 1, wherein moving the intelligent components occurs when a threat is not detected.

4. The method of claim 1, further comprising independently deciding to move the intelligent components from a first storage element location to a second storage element location via an independent decision-making process.

5. The method of claim 4, wherein the independent decision-making process avoids external intervention.

6. The method of claim 1, wherein moving the intelligent components further comprises:
replicating the intelligent components prior to moving when a threat is detected, and
moving away from a location of the threat in a random pattern.

7. The method of claim 1, further comprising communicating securely between the plurality of intelligent components.

8. The method of claim 1, wherein the encryption is unique for each of the plurality of intelligent components.

9. The method of claim 1, further comprising replicating the intelligent components for redundancy.

10. The method of claim 1, further comprising reporting the location of the intelligent components to a network of virtual hubs.

11. The method of claim 1, further comprising requesting a service that uses the intelligent components.

12. The method of claim 11, wherein a request for the service is received and processed by a virtual hub, the method further comprising, for each of the intelligent components, responding to a secure call from the virtual hub after the request is received and processed.

13. The method of claim 12, further comprising retrieving at least one of the intelligent components to perform the service.

14. The method of claim 13, further comprising combining at least a subset of the intelligent components to assemble the at least one component associated with the service.

15. The method of claim 14, further comprising deconstructing the assembled component after the service request is fulfilled.

16. The method of claim 1, wherein each of the intelligent components is independently operative to perform at least one of decision-making, replication, data encryption, distribution and secure communications.

17. The method of claim 1, wherein:
said encapsulating the plurality of fragments into respective intelligent components is performed by an intelligent component module executing on the at least one hardware processor; and
said decomposing each of the plurality of encrypted elements into a corresponding plurality of smaller fragments is carried out by said decomposition module executing on the at least one hardware processor.

18. An apparatus, comprising:
a memory; and
at least one processor coupled with the memory and operative:
to decompose at least one component associated with a service into a plurality of elements;
to encrypt the plurality of elements to generate a corresponding plurality of encrypted elements;
to decompose each of the plurality of encrypted elements into a corresponding plurality of smaller fragments, the plurality of fragments comprising subsets of bits of bytes from the encrypted elements;
to encapsulate the plurality of fragments into respective intelligent components, each of the intelligent components corresponding to a given one of the encapsulated fragments and forming a continuous fragmentation cell;
to distribute the intelligent components to a plurality of storage element locations; and
to move the intelligent components independently within the plurality of storage element locations, wherein each intelligent component independently determines a given storage element location into which that intelligent component should be moved next, and wherein the intelligent components do not have a predetermined destination.

19. The apparatus of claim 18, further comprising a plurality of distinct software modules, each of the distinct software modules being embodied on a computer-readable storage medium, and wherein the distinct software modules comprise an intelligent component module and a decomposition module, wherein encapsulating the plurality of fragments into respective intelligent components is performed by the intelligent component module executing on the at least one processor.

20. A computer program product comprising a non-transitory machine-readable storage medium having machine-readable program code embodied therewith, said machine-readable program code comprising:
machine-readable program code configured:
to decompose at least one component associated with a service into a plurality of elements;
to encrypt the plurality of elements to generate a corresponding plurality of encrypted elements;
to decompose each of the plurality of encrypted elements into a corresponding plurality of smaller fragments, the plurality of fragments comprising subsets of bits of bytes from the encrypted elements;
to encapsulate the plurality of fragments into respective intelligent components, each of the intelligent components corresponding to a given one of the encapsulated fragments and forming a continuous fragmentation cell;
to distribute the intelligent components to a plurality of storage element locations; and
to move the intelligent components independently within the plurality of storage element locations, wherein each intelligent component independently determines a given storage element location into which that intelligent component should be moved next, and wherein the intelligent components do not have a predetermined destination.

* * * * *